(12) United States Patent
Picard

(10) Patent No.: US 7,798,105 B1
(45) Date of Patent: Sep. 21, 2010

(54) METHOD OF INSTRUCTING A HORSE TO JUMP

(76) Inventor: Karen B. Picard, 320 West St., Bolton, CT (US) 06043

( * ) Notice: Subject to any disclaimer, the term of this patent is extended or adjusted under 35 U.S.C. 154(b) by 185 days.

(21) Appl. No.: 12/194,661

(22) Filed: Aug. 20, 2008

(51) Int. Cl.
*A01K 15/02* (2006.01)

(52) U.S. Cl. ...................................................... 119/705

(58) Field of Classification Search ................. 119/702, 119/705, 706; 434/225, 247, 255; 482/15–17; 54/71
See application file for complete search history.

(56) References Cited

U.S. PATENT DOCUMENTS

| | | | |
|---|---|---|---|
| D4,399 S | 10/1870 | Dandre | |
| 2,827,116 A | * 3/1958 | Zalovcik | 119/705 |
| 3,123,046 A | * 3/1964 | Bieber | 119/705 |
| 3,789,801 A | * 2/1974 | Moreng | 119/705 |
| 3,901,195 A | 8/1975 | Stewart | |
| 4,323,034 A | * 4/1982 | Carlson | 119/705 |
| 4,682,447 A | 7/1987 | Osborn | |
| 4,723,326 A | 2/1988 | Tarlow et al. | |
| 4,946,139 A | 8/1990 | Tomellini | |
| 4,989,821 A | * 2/1991 | Wong | 248/529 |
| 5,334,119 A | 8/1994 | Eloranta | |
| 5,474,026 A | * 12/1995 | Wohltjen | 119/28.5 |
| 5,586,520 A | 12/1996 | Cleary | |
| D378,713 S | 4/1997 | Holt | |
| 5,967,093 A | 10/1999 | Vitt et al. | |
| 6,234,708 B1 | 5/2001 | Beck et al. | |
| 6,416,247 B2 | 7/2002 | Beck et al. | |
| 6,604,489 B2 | 8/2003 | Wilkes et al. | |
| 6,615,837 B1 | 9/2003 | Griesbach, III | |
| 6,691,987 B1 | 2/2004 | Bonham | |
| 6,715,448 B1 | 4/2004 | McComb | |
| 7,261,140 B2 | 8/2007 | Whittemore | |

* cited by examiner

*Primary Examiner*—Rob Swiatek
*Assistant Examiner*—Ebony Evans
(74) *Attorney, Agent, or Firm*—Karen K. Chadwell; Deborah A. Basile; Doherty, Wallace, Pillsbury & Murphy, P.C.

(57) ABSTRACT

A method for instructing a horse to jump over a barricade, comprising acclimating the horse to the barricade, wherein such acclimation comprises providing a jump wherein the jump comprises an overlay having visually depicted thereon a realistic image of the barricade; providing the horse with visual access to the image depicted on the first overlay; and having the horse jump over the jump. The horse may be instructed to jump over an endless number of types of barricades simply by removing the overlay from the jump and replacing it with an overlay having depicted thereon a visual image of the desired type of barricade. By repeating the jumping process over the overlay bearing an image of the particular type of barricade, the horse will proficiently and cost effectively learn to jump over the actual barricade when presented to the barricade.

19 Claims, 4 Drawing Sheets

METHOD OF INSTRUCTING A HORSE TO JUMP

BACKGROUND OF THE INVENTION

1. Field of the Invention

The present invention relates to a method of instruction. More particularly, the invention relates to a method of teaching a horse to jump over a jump, wherein the jump is specially designed for such instruction.

2. Background.

In the area of equestrian shows and competitions, it is common to have horses jump over a variety of barricades, including, for example, walls, gates, bridges, fences, hedges, bushes, bodies of water, and the like. Therefore, to prepare the horse for these types of shows and competitions, it is widely beneficial to acclimate the horse to the type of barricades over which it will be expected to jump. To that end, the horse trainer needs to provide the horse with access to the barricades, and needs to have the horse practice jumping over the barricades so that, come show or competition time, the horse can competently and successfully perform the jump.

However, oftentimes it is difficult for the trainer to instruct the horse to jump over barricades as physical access to certain barricades may be financially costly, physically impractical to replicate, or dangerous to the horse and/or rider where the horse has not been previously exposed to the barricades and had practice jumping over the barricade.

It is standard practice in the field of horse jumping to instruct a horse to jump in general using equestrian jumps comprising posts and rails. Such jumps are relatively financially inexpensive, easy to access, safe for the practice of jumping, and lightweight, and hence, relatively easy to move about and transport. As the post and rail jumps have certain advantages in the training of equestrian jumping, and as the horse is expected to jump over, not just post and rail jumps, but also a variety of barricades when in show or competition, it would be advantageous to merge the concept of the barricade with the post and rail jump, and thereby train the horse to jump over a variety of types of barricades.

SUMMARY OF THE INVENTION

The above problems and difficulties are alleviated by a method of instructing a horse to jump, wherein the method comprises providing a jump specially designed to familiarize and ease the horse into jumping over barricades, particularly barricades commonly used in horse shows and competitions for jumping purposes. The jump is constructed to include those elements of conventionally used jumps which are considered particularly advantageous towards the instruction of equestrian jumping, and to incorporate a specially formulated overlay to the jump, wherein the overlay has disposed thereon a realistic visual representation of a barricade. When such an overlay is used in combination with the jump, a horse may be instructed to jump over the jump such that the horse is acclimated to the visual representation of the barricade, such that when it comes time for the horse to jump in a show or competition over the actual barricade represented by the visual representation, the horse will less likely meet the barricade with trepidation, thereby, enhancing the horse's jumping performance over the barricade.

In this fashion, then, a horse trainer can easily train a horse to jump over a barricade without encountering the attendant difficulties associated with obtaining the real-life barricade, wherein such difficulties include, for example, financial considerations and physical restrictions. Of course, other objects and advantages of the present invention will become obvious to persons of ordinary skill in the art, and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated.

DETAILED DESCRIPTION OF THE INVENTION

Figure 1:
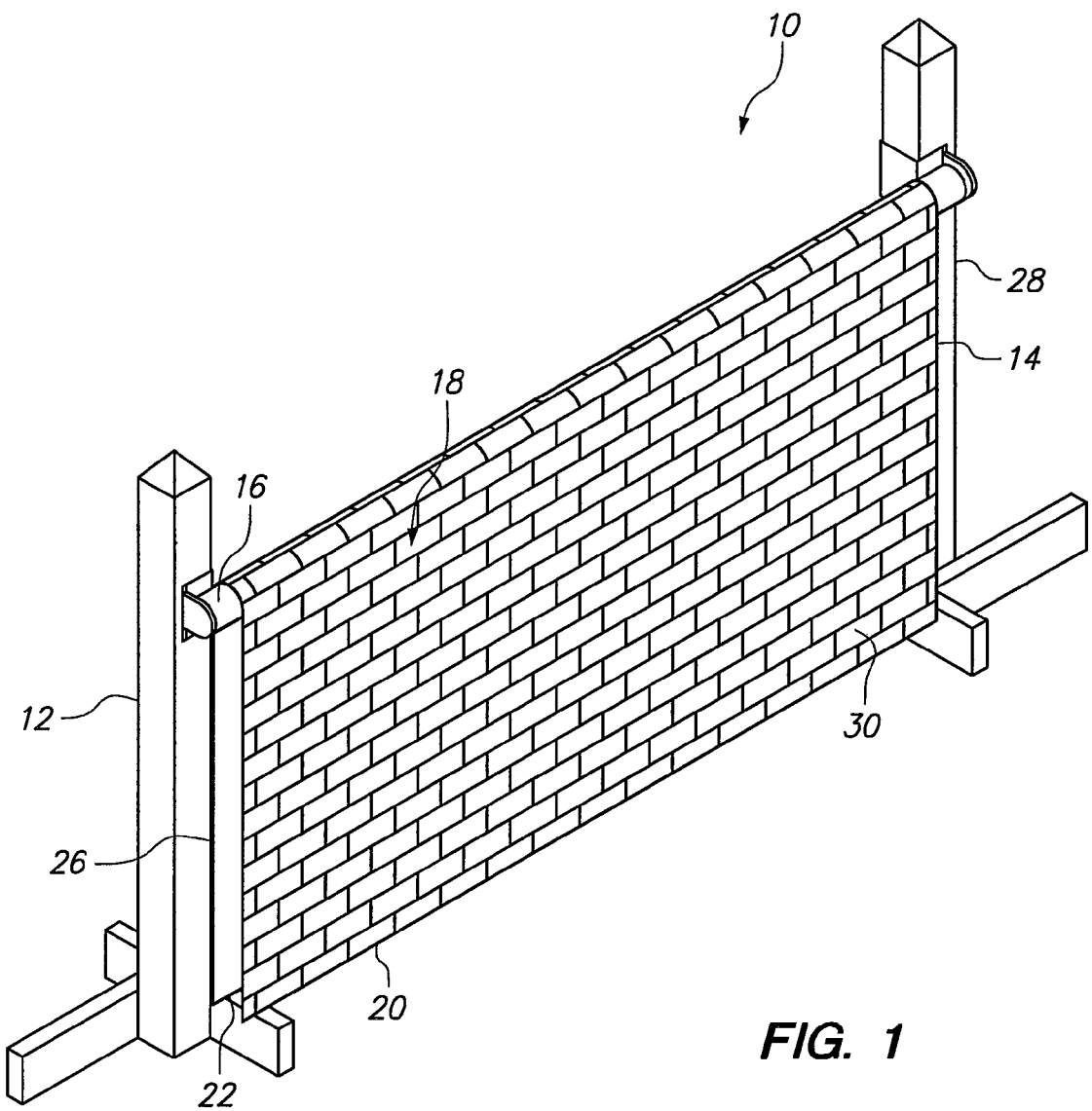
FIG. 1 is a schematic depicting a profile view of an exemplary jump.
Figure 2:
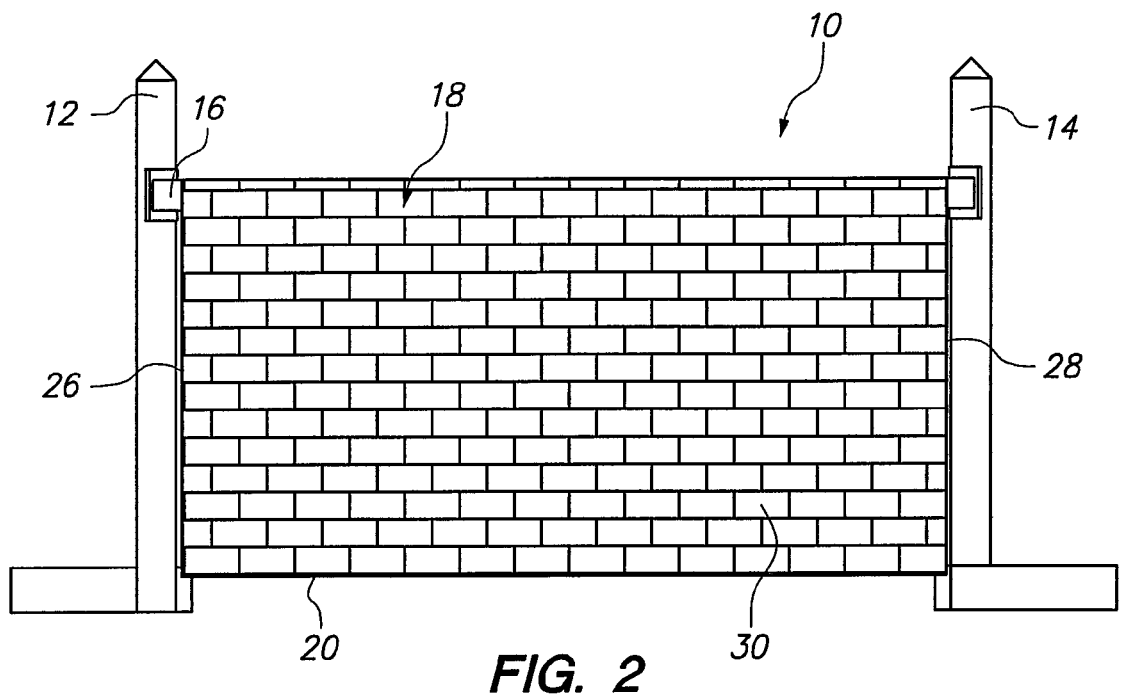
FIG. 2 is a schematic depicting a front side of the jump depicted in FIG. 1.
Figure 3:
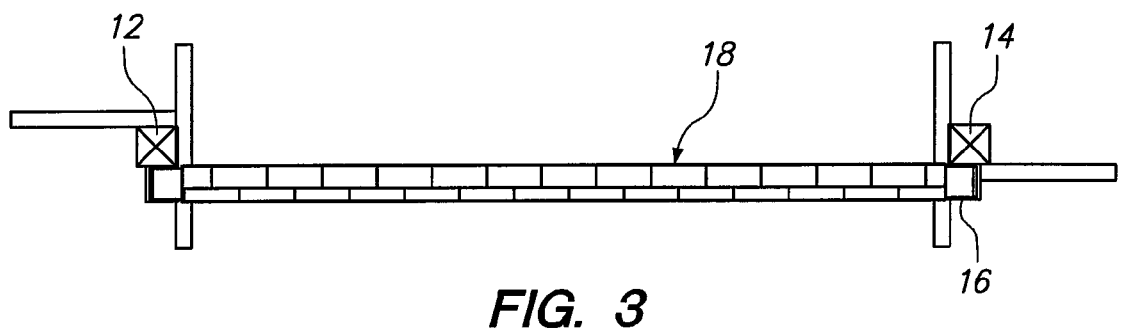
FIG. 3 is a schematic depicting a top side of the jump depicted in FIGS. 1 and 2.
Figure 4:
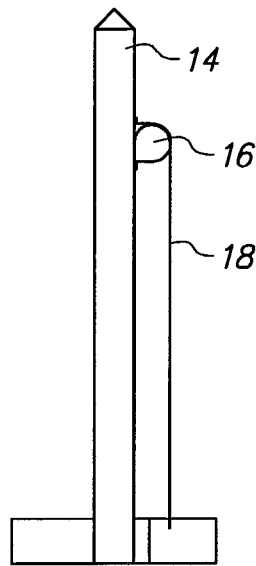
FIG. 4 is a schematic depicting a side view of the jump depicted in FIGS. 1-3.

In accordance with the invention, there is provided a method of instructing a horse to jump over a barricade. To that end, the jump over which the horse is instructed to jump comprises a pair of posts from which a rail extends and is suspended. The posts and rails may be of conventionally known form, construction and make, and combined in accord with conventionally known procedure. An inventive overlay, having visually depicted thereon a realistic looking image of a barricade, is positioned on the jump such that it hangs from the rail, and preferably extends along a length of the rail such that there is little to no gap between the overlay and the pair of posts. Furthermore or alternatively, the overlay preferably extends from the rail to as close to the ground as is possible. It is further preferred that the overlay be constructed such that it may be readily removed from the jump. Such ready removal allows the removed overlay to be readily replaced by another overlay comprising a visual representation of a different barricade. To that end, the overlay may be draped over the rail, may be held thereto by grommets, may be constructed to slide over the rail, or in any other like manner may be disposed on or in association with the rail such that the overlay may be readily removed from the jump while maintaining the overall integrity of the jump.

The overlay may comprise a wide variety of materials provided that the overlay is sufficiently durable to withstand the environmental factors to which it will be subjected when in use, and which will also allow an image to be depicted thereon. Exemplary materials include, for example, natural and/or synthetic woven and/or non-woven fibers, vinyl, nylon, polyester, rubber, plastic, and the like, and combinations thereof. Additionally, the overlay may be sufficiently weighted so that the ends of the overlay stay sufficiently in place when subjected to the environmental elements including, for example, normal wind and precipitation.

As stated above, the inventive overlay has imprinted, painted, grafted, or otherwise depicted thereon, a realistic looking image of a barricade. Although the barricade may comprise a variety of objects, exemplary barricades include those to which a horse is typically exposed to and expected to jump over in a horse show and/or competition. Particularly preferred barricades, may include, for example and without limitation, a wall, a gate, a fence, a hedge, a bush, bodies of water, and the like, and combinations of the foregoing.

Further disclosed herein is a method for instructing a horse to jump a barricade using the inventive jump disclosed herein. The method for instructing a horse to jump over a barricade, essentially comprises acclimating the horse to the barricade. To that end, the inventive jump disclosed aboveherein is provided, wherein the overlay of the jump has visually depicted thereon a realistic image of the barricade. The horse is provided with visual access to the image depicted on the overlay, and at the appropriate time when the horse has positioned itself sufficiently close to the jump, the horse is guided to jump over the jump. The horse may be instructed to jump over an endless number of types of barricades simply by removing the overlay from the jump and replacing it with an overlay having depicted thereon a visual image of the desired type of barricade. By repeating the jumping process over the overlay bearing an image of the particular type of barricade, the horse will proficiently and cost effectively learn to jump over the actual barricade when presented to the actual barricade.

Figure 5:
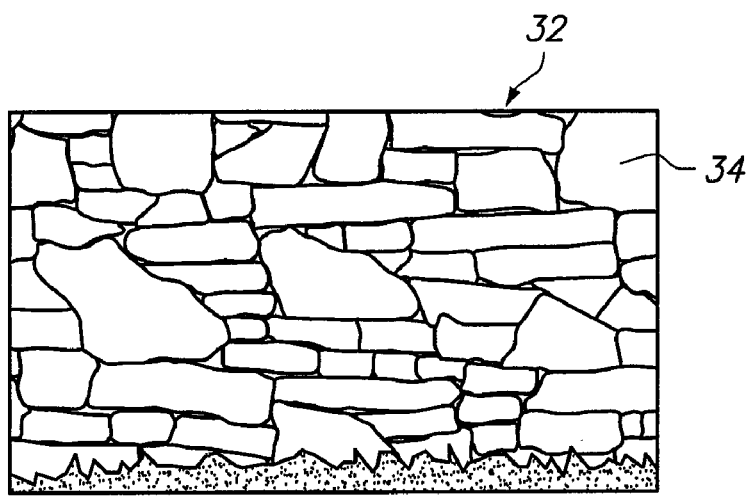
FIG. 5 is a schematic depicting an exemplary overlay comprising an image of a stone wall and grass.
Figure 6:
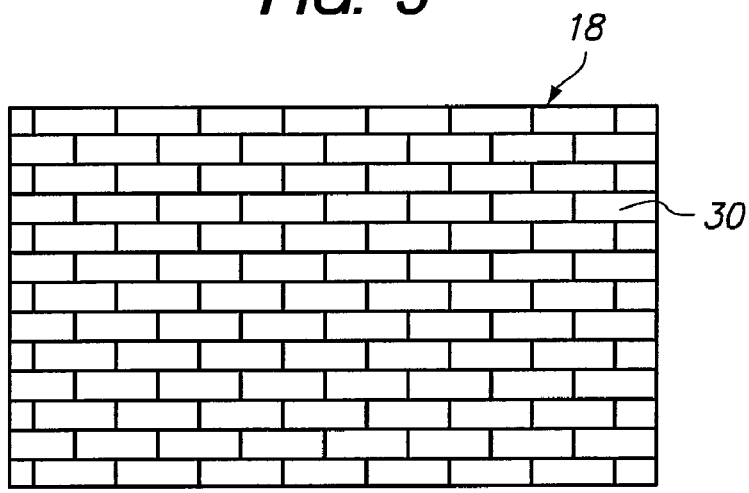
FIG. 6 is a schematic depicting another exemplary overlay comprising an image of a brick wall.
Figure 7:
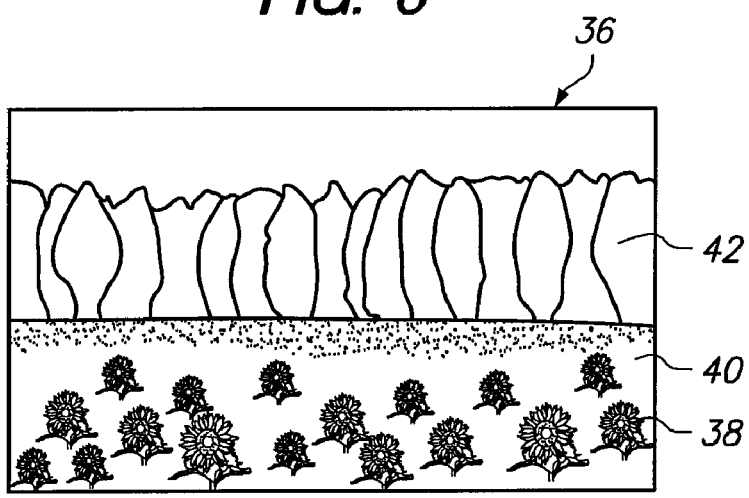
FIG. 7 is a schematic depicting another exemplary overlay comprising an image of flowers on grass and of bushes.

An exemplary jump is depicted in FIGS. 1-4, and exemplary overlays are depicted in FIGS. 5-7. It is noted herein, however, that the invention is not to be construed as limited to the figures, but includes all natural variations and modifications thereto. Furthermore, it is to be realized that the optimum relationships for the parts of the invention, which include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Also, since numerous modifications and changes will readily occur to those skilled in the art, it is not desired to limit the invention to the exact construction and operation shown and described, and accordingly, all suitable modifications and equivalents may be resorted to, falling within the scope of the invention.

Referring to FIGS. 1-4, an exemplary jump 10 comprises a post 12 placed in parallel alignment with a post 14. A rail 16 of jump 10 is engaged with posts 12 and 14 and suspended therefrom by draping an overlay 18 of jump 10 over rail 16 such that a top end 20 and a bottom end 22 of overlay 18 just touches the ground onto which posts 12 and 14 are rested, and a lateral side 26 and a lateral side 28 of overlay 18 respectively extends to posts 12 and 14. Depicted on overlay 18 is a realistic image of a brick wall 30 comprising a plurality of bricks stacked in a fashion to create the image of a real-life brick wall. Although overlay 18 has an image of brick wall 30 depicted thereon, as stated above, the image may comprise a wide variety of scenes wherein exemplary scenes include barricades commonly used in horse jumping shows and/or competitions, wherein some of such exemplary barricades are included in FIGS. 5-8, wherein FIG. 5 depicts an overlay 32 having depicted thereon an image of a plurality of stones stacked to create the realistic look of a stone wall 34, and FIG. 7 depicts an overlay 36 having depicted thereon an image of flowers 38 on grass 40 in front of a backdrop of bushes 42.

Figure 8:
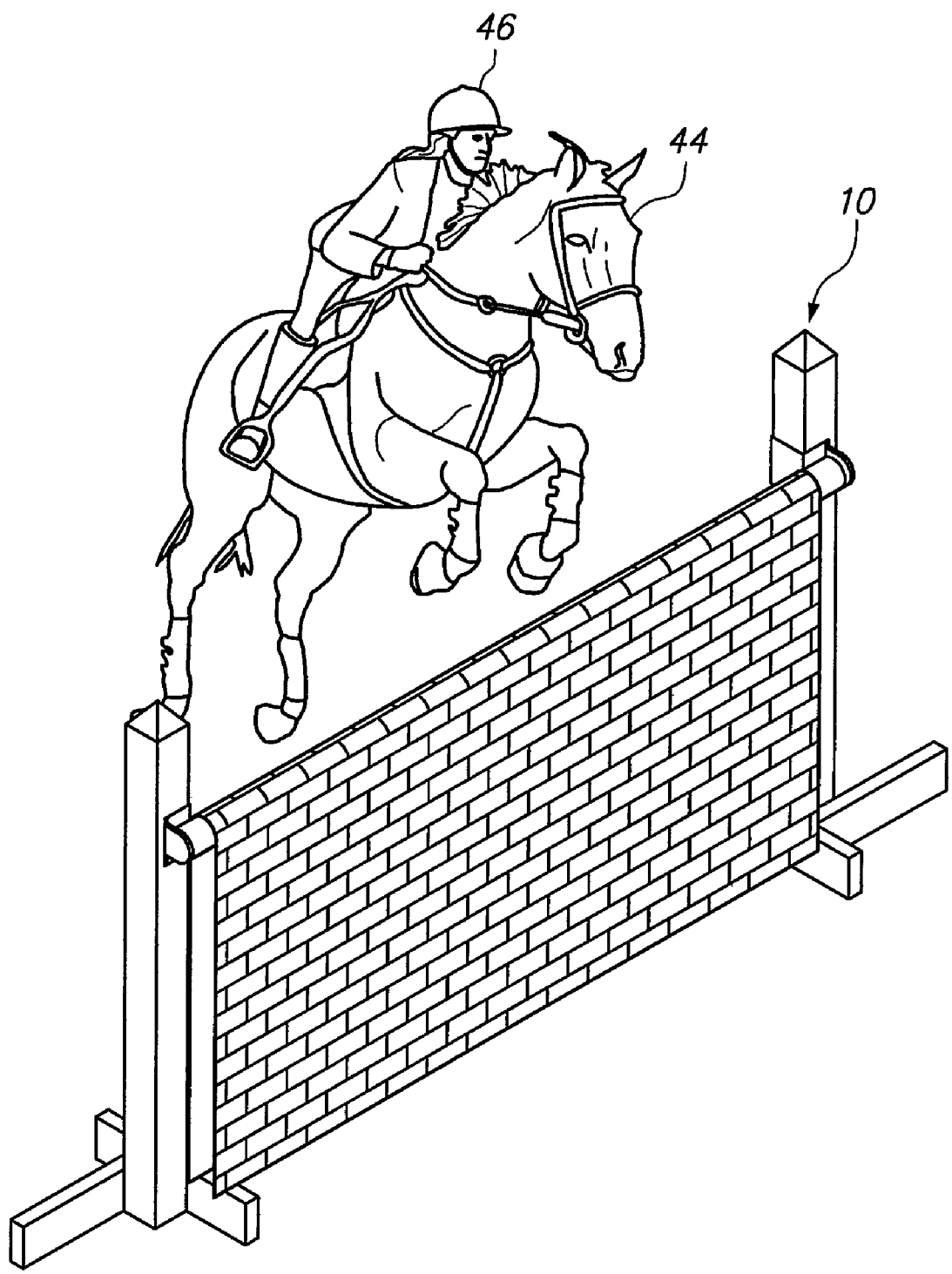
FIG. 8 is a schematic depicting a horse jumping over the exemplary jump depicted in FIGS. 1-4.

An exemplary method for instructing a horse to jump over the jump disclosed herein is discussed with reference to the figures. An exemplary method comprises providing jump 10 as disclosed herein. Providing jump 10 comprises suspending rail 16 from posts 12 and 14. The method further comprises acclimating a horse 44 to a barricade (not shown) to which horse 44 will be exposed to during a jumping show or competition. Such acclimation comprises providing overlay 18 having depicted thereon an image of the barricade. As overlay 18 comprises an authentic looking brick wall 30, the barricade in this example to which a trainer 46 would be interested in acclimating horse 44 would be a brick wall. Providing the overlay comprises suspending the overlay from rail 16, preferably such that lateral sides 26 and 28 of overlay abut or otherwise come as close as possible to respective rails 12 and 14, and also preferably such that top end 20 and bottom end 22 of overlay 18 touch, or come as close as possible, to the ground. Assimilation further comprises having horse 44 repeatedly jump over jump 10. As shown in FIG. 8, in an exemplary embodiment, trainer 46 is positioned in riding position on horse 44 such that trainer 46 can properly guide horse 44 over jump 10. The method further comprises acclimating horse 44 to other types of barricades, wherein such types may be different from a stone wall or may be a stone wall having a different look from the stone wall depicted in overlay 18. Such acclimation comprises removing overlay 18 from rail 16 and suspending an overlay comprising the other barricade to which acclimation is desired. In this manner then, a horse may be instructed to jump over a variety of barricades without the need of providing the actual barricade. Hence, the horse can proficiently learn to jump over a wide variety of barricades in a relatively safe, cost-effective, and physically practical manner.

What is claimed is:

1. A method for instructing a horse to jump over barricades, comprising:
    acclimating the horse to a first type of barricade, comprising:
        (a) providing a jump wherein the jump comprises a first overlay having visually depicted thereon an image of the first type of barricade;
        (b) providing the horse with visual access to the image of the first type of barricade depicted on the first overlay;
        (c) having the horse jump over the jump while the image of the first type of barricade on the first overlay is exposed on the jump; and
        (d) exposing the horse to the first type of barricade, comprising having the horse approach and jump over the first type of barricade.

2. The method of claim 1, further comprising repeating steps (b)-(c) until the horse successfully completes the jump without trepidation.

3. The method of claim 1, further comprising:
    acclimating the horse to a second type of barricade, wherein the first type of barricade is different from the second type of barricade, comprising:
        (e) removing the first overlay from the jump;
        (f) applying a second overlay to the jump, wherein the second overlay has visually depicted thereon an image of the second type of barricade;
        (g) providing the horse with visual access to the image of the second type of barricade depicted on the second overlay; and
        (h) having the horse jump over the jump while the image of the second type of barricade on the second overlay is exposed on the jump.

4. The method of claim 3, wherein the jump comprises:
    a first post in parallel alignment with a second post; and
    a rail suspended from the first and second posts;

wherein the first post and the second post are positioned and stabilized on a ground, and further wherein applying the second overlay to the jump comprises suspending the second overlay from the rail.

5. The method of claim 4, further comprising repeating steps (g)-(h) until the horse successfully completes the jump over the jump without trepidation, wherein the jump has the image of the second type of barricade on the second overlay exposed thereon.

6. The method of claim 5, further comprising exposing the horse to the second type of barricade, comprising having the horse approach and jump over the second type of barricade.

7. The method of claim 6, wherein the first type of barricade and the second type of barricade comprise an actual or a replica of one or more of a stone wall, a brick wall, a fence, a gate, a bridge, a hedge, a bush, grass, flowers, and a body of water.

8. The method of claim 7, wherein the image of the first barricade and the image of the second barricade are imprinted, painted, or grafted onto the respective first overlay and second overlay.

9. The method of claim 3, wherein the image of the first barricade and the image of the second barricade are imprinted, painted, or grafted onto the respective first overlay and second overlay.

10. The method of claim 1, wherein the image of the first type of barricade is imprinted, painted, or grafted onto the first overlay.

11. The method of claim 10, wherein the jump comprises:
a first post in parallel alignment with a second post; and
a rail suspended from the first and second posts;
wherein the first post and the second post are positioned and stabilized on a ground, and further wherein the first overlay is suspended from the rail and extends from the rail to the ground.

12. The method of claim 11, wherein the first overlay is draped over the rail.

13. The method of claim 11, wherein the first overlay comprises a first lateral side opposite to a second lateral side, wherein the first lateral side abuts the first post and the second lateral side abuts the second post, and further wherein the first overlay comprises a bottom side defining its lowermost boundary, wherein the bottom side touches the ground.

14. The method of claim 10, wherein the first type of barricade comprises an actual or a replica of one or more of a stone wall, a brick wall, a fence, a gate, a bridge, a hedge, a bush, grass, flowers, and a body of water.

15. The method of claim 1, wherein the first type of barricade comprises an actual or a replica of one or more of a stone wall, a brick wall, a fence, a gate, a bridge, a hedge, a bush, grass, flowers, and a body of water.

16. The method of claim 15, wherein the image of the first barricade is imprinted, painted, or grafted onto the first overlay.

17. The method of claim 15, wherein the jump comprises:
a first post in parallel alignment with a second post; and
a rail suspended from the first and second posts;
wherein the first post and the second post are positioned and stabilized on a ground, and further wherein the first overlay is suspended from the rail and extends from the rail to the ground.

18. The method of claim 17, wherein the first overlay is draped over the rail.

19. The method of claim 17, wherein the first overlay comprises a first lateral side opposite to a second lateral side, wherein the first lateral side abuts the first post and the second lateral side abuts the second post, and further wherein the first overlay comprises a bottom side defining its lowermost boundary, wherein the bottom side touches the ground.

* * * * *